(12) United States Patent
Yiu et al.

(10) Patent No.: US 11,363,476 B2
(45) Date of Patent: *Jun. 14, 2022

(54) TECHNIQUES IN MEASUREMENT GAP CONFIGURATIONS IN NEW RADIO (NR)

(71) Applicant: Apple Inc., Cupertino, CA (US)

(72) Inventors: Candy Yiu, Portland, OR (US); Jie Cui, Santa Clara, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/392,936

(22) Filed: Apr. 24, 2019

(65) Prior Publication Data

US 2019/0253909 A1    Aug. 15, 2019

Related U.S. Application Data

(60) Provisional application No. 62/668,059, filed on May 7, 2018.

(51) Int. Cl.
| | |
|---|---|
| *H04W 24/10* | (2009.01) |
| *H04W 72/04* | (2009.01) |
| *H04W 76/27* | (2018.01) |
| *H04W 88/02* | (2009.01) |
| *H04W 88/08* | (2009.01) |

(52) U.S. Cl.
CPC ....... *H04W 24/10* (2013.01); *H04W 72/0453* (2013.01); *H04W 76/27* (2018.02); *H04W 88/023* (2013.01); *H04W 88/08* (2013.01)

(58) Field of Classification Search
CPC . H04W 24/10; H04W 72/0453; H04W 76/27; H04W 88/023; H04W 88/08
USPC ........................................................ 370/329
See application file for complete search history.

(56) References Cited

U.S. PATENT DOCUMENTS

| | | | |
|---|---|---|---|
| 2012/0033645 A1* | 2/2012 | Mantravadi | H04W 72/044 370/336 |
| 2019/0173634 A1* | 6/2019 | Teyeb | H04W 72/0453 |
| 2020/0099560 A1* | 3/2020 | Li | H04W 28/06 |

OTHER PUBLICATIONS

3GPP, "Technical Specification Group Radio Access Network; NR; Radio Resource Control (RRC) protocol specification (Release 15)," 3GPP TS 38.331 V15.1 0 (Mar. 2018), 5G, 268 pages.
3GPP, "Technical Specification Group Radio Access Network; NR; Requirements for support of radio resource management (Release 15)," 3GPP TS 38.133 V15.1.0 (Mar. 2018), 5G, 59 pages.

* cited by examiner

*Primary Examiner* — Omar J Ghowrwal
(74) *Attorney, Agent, or Firm* — Sterne, Kessler, Goldstein & Fox P.L.L.C.

(57) ABSTRACT

Embodiments of the present disclosure describe methods, apparatuses, storage media, and systems for beam management techniques in New Radio (NR) Standalone (SA) applications. Various embodiments describe how to configure one or more measurement gaps in an NR SA network so that a UE may apply the same or different measurement gaps while operating with various technologies or services in various frequency ranges. Other embodiments may be described and claimed.

20 Claims, 7 Drawing Sheets

TECHNIQUES IN MEASUREMENT GAP CONFIGURATIONS IN NEW RADIO (NR)

CROSS REFERENCE TO RELATED APPLICATION

The present application claims priority to U.S. Provisional Patent Application No. 62/668,059, filed May 7, 2018, entitled "Measurement Gap Configuration in Standalone (SA) in New Radio (NR) System," the entire disclosure of which is hereby incorporated by reference in its entirety.

FIELD

Embodiments of the present invention relate generally to the technical field of wireless communications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

The initial Fifth Generation (5G) New Radio (NR) is implemented in a Non-Standalone (NSA) network that incorporate both Long Term Evolution (LTE) and NR, for example, an E-UTRA (Evolved Universal Terrestrial Radio Access)-NR Dual Connectivity (EN-DC) network. In an EN-DC network, the 5G NR may be supported by existing Fourth Generation (4G) infrastructures and frameworks. For example, an NR-enabled user equipment (UE) may use 5G NR for data-throughput improvements but still use 4G for non-data duties such as configuring measurement gap. In an NR Standalone (SA) network, the existing technologies may not be feasible in handling non-data duties. New solutions are needed in this regard.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
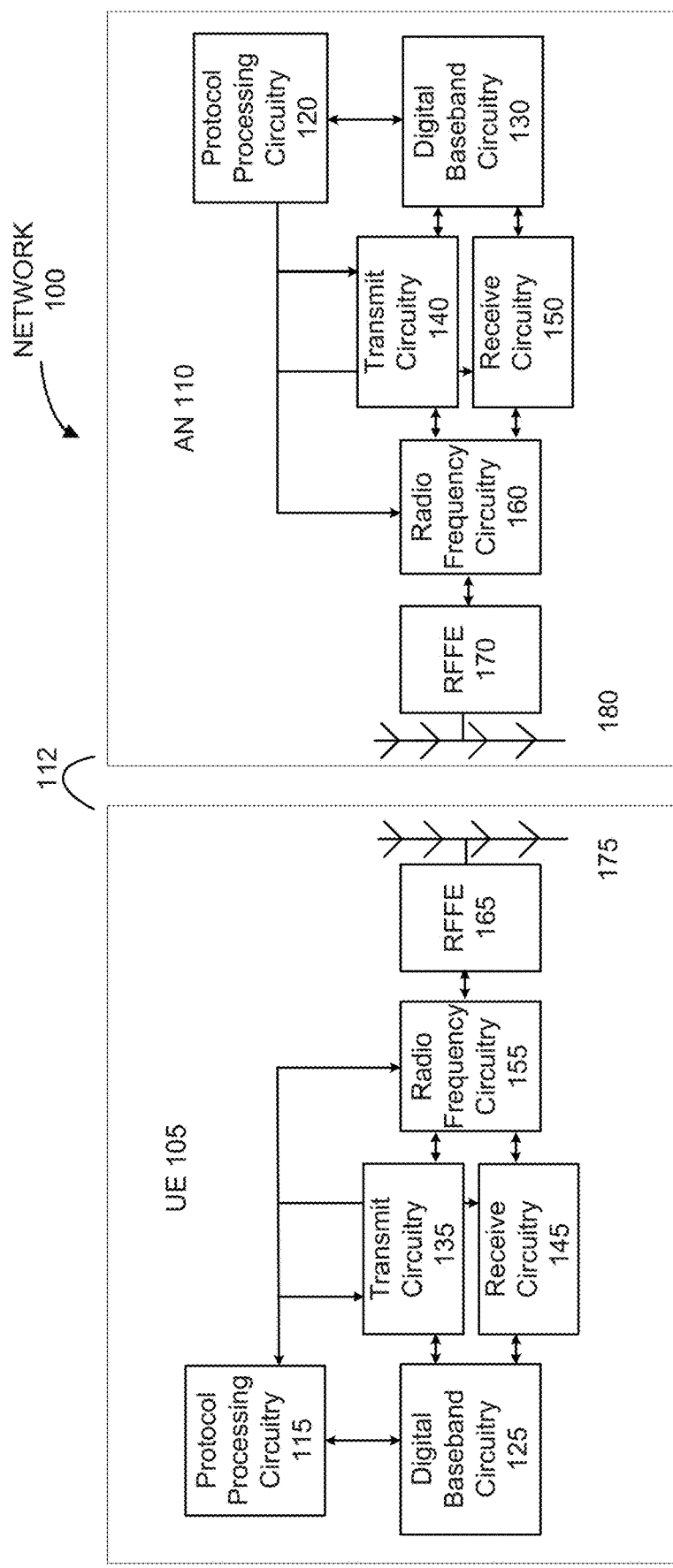
FIG. 1 schematically illustrates an example of a network comprising a user equipment (UE) and an access node (AN) in a wireless network, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include any combination of integrated circuits (for example, a field-programmable gate array (FPGA), an application specific integrated circuit (ASIC), etc.), discrete circuits, combinational logic circuits, system on a chip (SOC), system in a package (SiP), that provides the described functionality. In some embodiments, the circuitry may execute one or more software or firmware modules to provide the described functions. In some embodiments, circuitry may include logic, at least partially operable in hardware.

There are various bands below 6 GHz in 4G LTE networks. In NR, frequency range 1 (FR1) overlaps and extends 4G LTE frequencies, including various bands from 450 MHz to 6,000 MHz, which is commonly referred to as NR sub-6 GHz. NR further includes a frequency range 2 (FR2) covering from 24,250 MHz to 52,600 MHz, which is commonly referred to as mmWave, even though the millimeter wave frequency may start at 30 GHz strictly speaking. Herein, the pairs of FR1/FR2 and sub-6 GHz (below 6 GHz)/mmWave are used interchangeably.

Multi-Radio Access Technology (RAT) Dual Connectivity (MR-DC) may involve a multiple reception (Rx)/transmission (Tx) UE that may be configured to utilize radio resources provided by two distinct schedulers in two different nodes connected via non-ideal backhaul, one providing Evolved Universal Terrestrial Radio Access (E-UTRA) access and the other one providing NR access. One scheduler is located in a Master Node (MN) and the other in the Secondary Node (SN). The MN and SN are connected via a network interface and at least the MN is connected to the core network.

MR-DC may include E-UTRA-NR Dual Connectivity (EN-DC) or NG-RAN E-UTRA-NR Dual Connectivity (NGEN-DC). In EN-DC communications, a UE may be connected to one evolved NodeB (eNB) that acts as an MN and one en-next generation NodeB (gNB) that acts as an SN. The eNB is connected to an evolved packet core (EPC) and the en-gNB is connected to the eNB. The en-gNB may be a node that provides new radio (NR) user-plane and control-plane protocol terminations towards the UE, and acts as the SN in EN-DC.

In EN-DC and similar communications that involve an MN of non-NR operation, measurement gap configuration may be one of the non-data duties. A measurement gap configuration schedules a gap period repeatedly so that a UE may use the configured period to conduct a non-data duty, for example, cell measurements. A UE may use measurement gaps to identify and measure intra-frequency cells, intra-frequency cells, and/or inter-RAT E-UTRAN cells. A measurement gap configuration may correspond to one or more measurement gap patterns on which the UE's operations may be based. The operations may include identifying and measuring cells in the network, and other non-data operations. A UE may be configured with a measurement gap while operating at any frequency in either FR1 or FR2. Such a measurement gap configuration may be referred to as a UE gap. A UE measurement gap may also be used when the UE is to do measurements associated with an E-UTRAN (LTE) cell, since the E-UTRAN frequencies are included in or overlapped with the FR1.

In some situations, a UE may be configured with more than one measurement gap according to different frequencies at which the UE may operate. For example, a UE may comply with respective measurement gaps while operating at FR1 and FR2 to accommodate different operations at different frequency ranges. These FR1 measurement gap and FR2 measurement gap are referred to as FR measurement gap in general.

In EN-DC communications, a UE measurement gap configuration may be scheduled by the MN to configure the UE to use a single measurement gap while operating at an LTE carrier frequency, an FR1 frequency or an FR2 frequency. Meanwhile, under the theme of FR measurement gap configuration, an FR1 measurement gap may be scheduled by the MN and an FR2 measurement gap may be scheduled by the SN so that the UE may comply with respective measurement gaps while operating in respective FR1 and FR2 ranges. The MN may schedule the UE or FR1 measurement gap configuration via an LTE Radio Resource Control (RRC) message, whereas the SN may schedule an FR2 measurement gap via an NR RRC message.

However, an NR SA network may not have an access node (AN) that operates with LTE technologies for non-data duties. Thus, it may not be possible to configure the UE or FR1 measurement gap to a UE by an AN of NR technologies (e.g., gNB) in the NR SA network. In NR SA, new implementations are needed to accommodate this issue.

Embodiments described herein may include, for example, apparatuses, methods, and storage media for configuring and implementing measurement gaps of, or related to, NR SA operations while a UE may be configured with a single or multiple measurement gaps by a gNB in an NR SA network.

FIG. 1 schematically illustrates an example wireless network 100 (hereinafter "network 100") in accordance with various embodiments herein. The network 100 may include a UE 105 in wireless communication with an AN 110. In some embodiments, the network 100 may be a NR SA network. The UE 105 may be configured to connect, for example, to be communicatively coupled, with the AN 110. In this example, the connection 112 is illustrated as an air interface to enable communicative coupling, and can be consistent with cellular communications protocols such as a 5G NR protocol operating at mmWave and sub-6 GHz, a Global System for Mobile Communications (GSM) protocol, a code-division multiple access (CDMA) network protocol, a Push-to-Talk (PTT) protocol, and the like.

The UE 105 is illustrated as a smartphone (for example, a handheld touchscreen mobile computing device connectable to one or more cellular networks), but may also comprise any mobile or non-mobile computing devices, such as a Personal Data Assistant (PDA), pager, laptop computer, desktop computer, wireless handset, customer premises equipment (CPE), fixed wireless access (FWA) device, vehicle mounted UE or any computing device including a wireless communications interface. In some embodiments, the UE 105 can comprise an Internet of Things (IoT) UE, which can comprise a network access layer designed for low-power IoT applications utilizing short-lived UE connections. An IoT UE can utilize technologies such as narrowband IoT (NB-IoT), machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The AN 110 can enable or terminate the connection 112. The AN 110 can be referred to as a base station (BS), NodeB, evolved-NodeB (eNB), Next-Generation NodeB (gNB or ng-gNB), NG-RAN node, cell, serving cell, neighbor cell, and so forth, and can comprise ground stations (for example, terrestrial access points) or satellite stations providing coverage within a geographic area.

The AN 110 can be the first point of contact for the UE 105. In some embodiments, the AN 110 can fulfill various logical functions including, but not limited to, radio network controller (RNC) functions such as radio bearer management, uplink and downlink dynamic radio resource management and data packet scheduling, and mobility management.

In some embodiments, a downlink resource grid can be used for downlink transmissions from the AN 110 to the UE 105, while uplink transmissions can utilize similar techniques. The grid can be a time-frequency grid, called a resource grid or time-frequency resource grid, which is the physical resource in the downlink in each slot. Such a time-frequency plane representation is a common practice for orthogonal frequency division multiplexing (OFDM) systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 105. The physical downlink control channel (PDCCH) may carry information about the transport format and resource allocations related to the PDSCH channel, among other things. It may also inform the UE 105 about the transport format, resource allocation, and hybrid automatic repeat request (HARQ) information related to the uplink shared channel. Typically, downlink scheduling (assigning control and shared channel resource blocks to the UE 105 within a cell) may be performed at the AN 110 based on channel quality information fed back from any of the UE 105. The downlink resource assignment information may be sent on the PDCCH used for (for example, assigned to) the UE 105.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition.

Some embodiments may use concepts for resource allocation for control channel information that are an extension of the above-described concepts. For example, some embodiments may utilize an enhanced physical downlink control channel (ePDCCH) that uses PDSCH resources for control information transmission. The ePDCCH may be transmitted using one or more enhanced control channel elements (ECCEs). Similar to the above, each ECCE may correspond to nine sets of four physical resource elements known as enhanced resource element groups (EREGs). An ECCE may have other numbers of EREGs in some situations.

As shown in FIG. 1, the UE 105 may include millimeter wave communication circuitry grouped according to functions. The circuitry shown here is for illustrative purposes and the UE 105 may include other circuitry shown in FIG. 3. The UE 105 may include protocol processing circuitry 115, which may implement one or more of layer operations related to medium access control (MAC), radio link control (RLC), packet data convergence protocol (PDCP), radio resource control (RRC) and non-access stratum (NAS). The protocol processing circuitry 115 may include one or more processing cores (not shown) to execute instructions and one or more memory structures (not shown) to store program and data information.

The UE 105 may further include digital baseband circuitry 125, which may implement physical layer (PHY) functions including one or more of HARQ functions, scrambling and/or descrambling, coding and/or decoding, layer mapping and/or de-mapping, modulation symbol mapping, received symbol and/or bit metric determination, multi-antenna port pre-coding and/or decoding, which may include one or more of space-time, space-frequency or spatial coding, reference signal generation and/or detection, preamble sequence generation and/or decoding, synchronization sequence generation and/or detection, control channel signal blind decoding, and other related functions.

The UE 105 may further include transmit circuitry 135, receive circuitry 145, radio frequency (RF) circuitry 155, and RF front end (RFFE) 165, which may include or connect to one or more antenna panels 175.

In some embodiments, RF circuitry 155 may include multiple parallel RF chains or branches for one or more of transmit or receive functions; each chain or branch may be coupled with one antenna panel 175.

In some embodiments, the protocol processing circuitry 115 may include one or more instances of control circuitry (not shown) to provide control functions for the digital baseband circuitry 125 (or simply, "baseband circuitry 125"), transmit circuitry 135, receive circuitry 145, radio frequency circuitry 155, RFFE 165, and one or more antenna panels 175.

Figure 2:
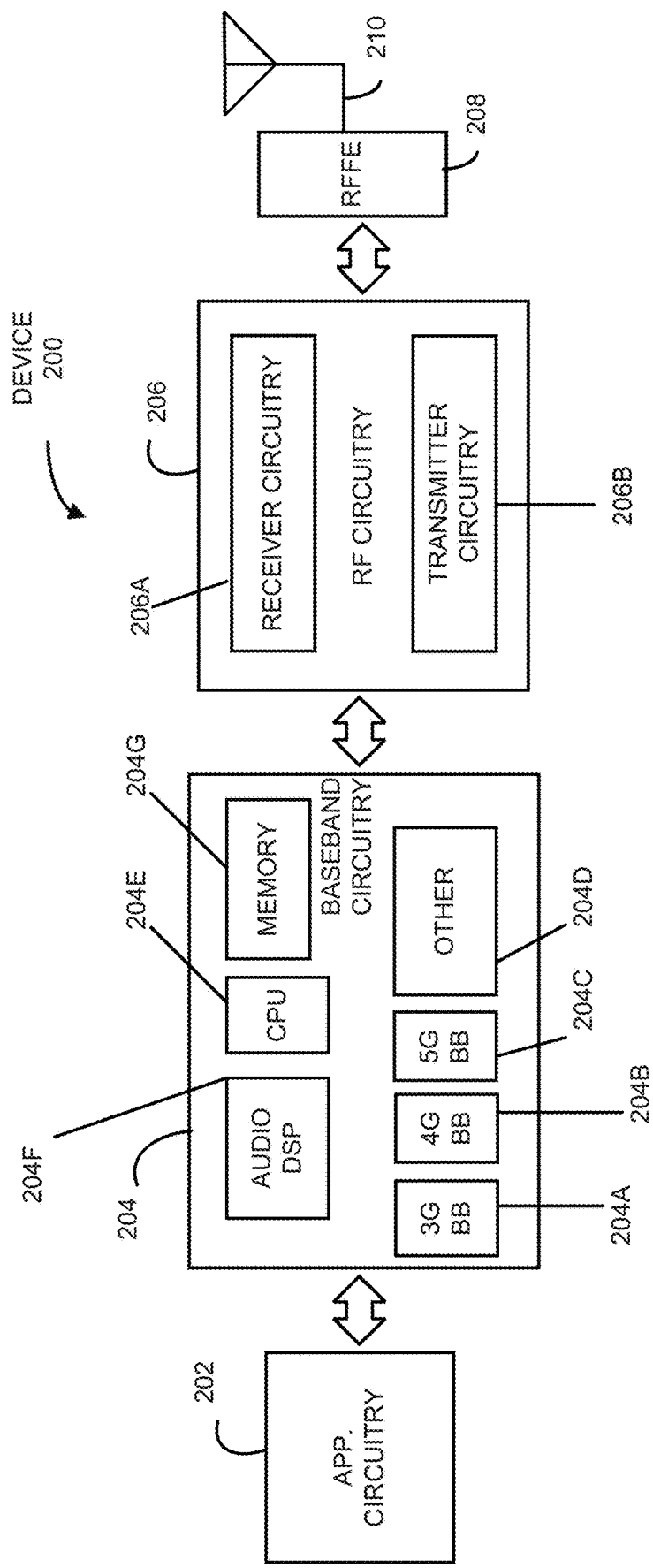
FIG. 2 illustrates example components of a device in accordance with various embodiments.
Figure 6:
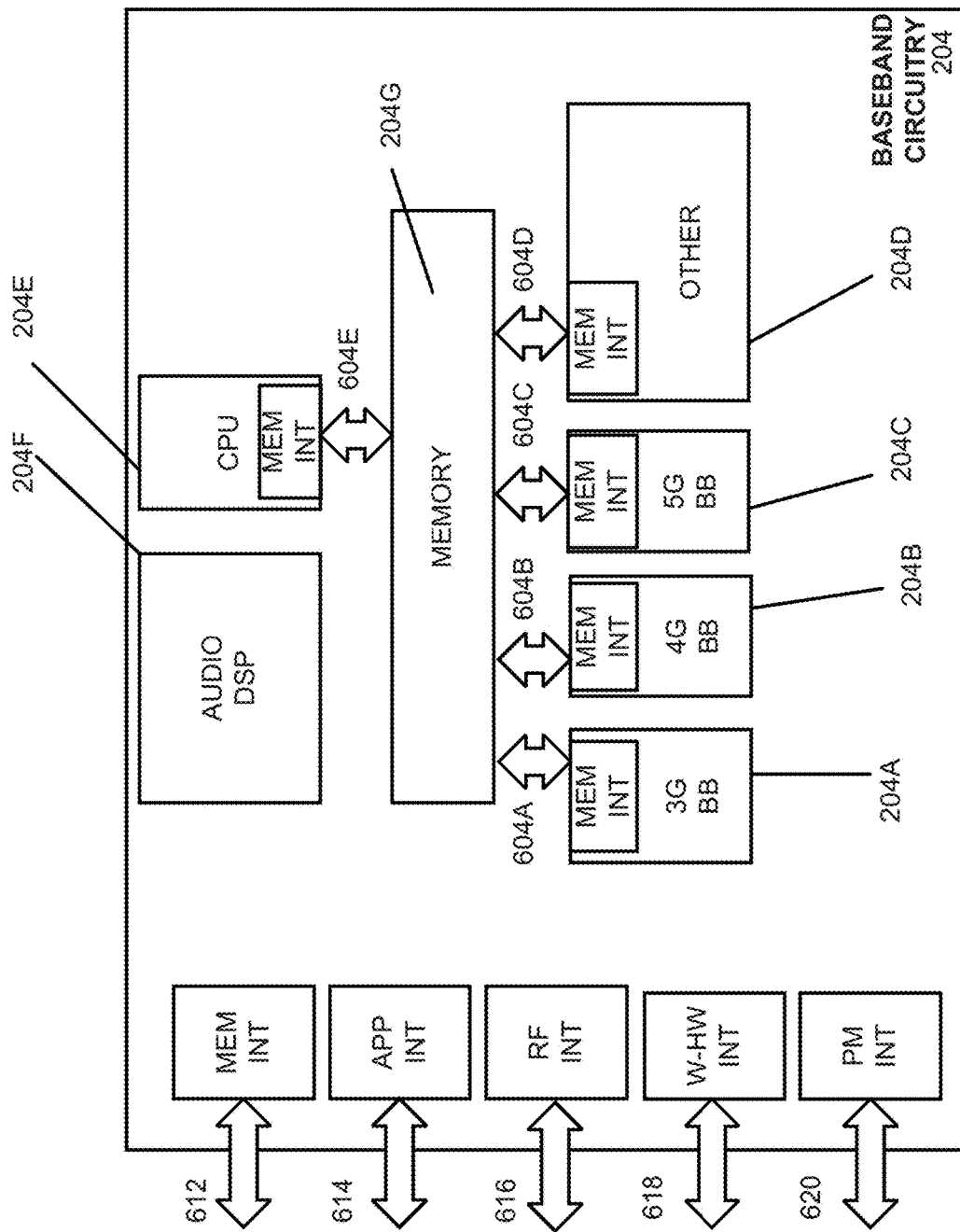
FIG. 6 illustrates example interfaces of baseband circuitry in accordance with some embodiments.

A UE reception may be established by and via the one or more antenna panels 175, RFFE 165, RF circuitry 155, receive circuitry 145, digital baseband circuitry 125, and protocol processing circuitry 115. The one or more antenna panels 175 may receive a transmission from the AN 110 by receive-beamforming signals received by a plurality of antennas/antenna elements of the one or more antenna panels 175. Further details regarding the UE 105 architecture are illustrated in FIGS. 2, 3, and 6. The transmission from the AN 110 may be transmit-beamformed by antennas of the AN 110. In some embodiments, the baseband circuitry 125 may contain both the transmit circuitry 135 and the receive circuitry 145. In other embodiments, the baseband circuitry 125 may be implemented in separate chips or modules, for example, one chip including the transmit circuitry 135 and another chip including the receive circuitry 145.

Similar to the UE 105, the AN 110 may include mmWave/sub-mmWave communication circuitry grouped according to functions. The AN 110 may include protocol processing circuitry 120, digital baseband circuitry 130 (or simply, "baseband circuitry 130"), transmit circuitry 140, receive circuitry 150, RF circuitry 160, RFFE 170, and one or more antenna panels 180.

A cell transmission may be established by and via the protocol processing circuitry 120, digital baseband circuitry 130, transmit circuitry 140, RF circuitry 160, RFFE 170, and one or more antenna panels 180. The one or more antenna panels 180 may transmit a signal by forming a transmit beam. FIG. 3 further illustrates details regarding the RFFE 170 and antenna panel 180.

FIG. 2 illustrates example components of a device 200 in accordance with some embodiments. In contrast to FIG. 1, FIG. 2 illustrates example components of the UE 105 or the AN 110 from a receiving and/or transmitting function point of view, and it may not include all of the components described in FIG. 1. In some embodiments, the device 200 may include application circuitry 202, baseband circuitry 204, RF circuitry 206, RFFE circuitry 208, and a plurality of antennas 210 together at least as shown. The baseband circuitry 204 may be similar to and substantially interchangeable with the baseband circuitry 125 in some embodiments. The plurality of antennas 210 may constitute one or more antenna panels for beamforming. The components of the illustrated device 200 may be included in a UE or an AN.

In some embodiments, the device 200 may include fewer elements (for example, a cell may not utilize the application circuitry 202, and instead include a processor/controller to process IP data received from an EPC). In some embodiments, the device 200 may include additional elements such as, for example, a memory/storage, display, camera, sensor, or input/output (I/O) interface. In other embodiments, the components described below may be included in more than one device (for example, said circuitry may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (for example, graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may be similar to and substantially interchangeable with the baseband circuitry 125 and the baseband circuitry 130 in some embodiments. The baseband circuitry 204 may include one or more baseband processors or control logic to process baseband signals received from a receive signal path of the RF circuitry 206 and to generate baseband signals for a transmit signal path of the RF circuitry 206. Baseband circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (for example, second generation (2G), sixth generation (6G), etc.). The baseband circuitry 204 (for example, one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a central processing unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may include elements for compression/decompression and echo cancellation and may include other suitable processing elements in other embodiments. Components of the baseband circuitry may be suitably combined in a single chip, in a single chipset, or disposed on a same circuit board in some embodiments. In some embodiments, some or all of the constituent components of the baseband circuitry 204 and the application circuitry 202 may be implemented together such as, for example, on a SOC.

In some embodiments, the baseband circuitry 204 may provide for communication compatible with one or more radio technologies. For example, in some embodiments, the baseband circuitry 204 may support communication with an evolved universal terrestrial radio access network (E-UTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include one or more switches, filters, amplifiers, etc. to facilitate the communication with the wireless network. RF circuitry 206 may include receiver circuitry 206A, which may include circuitry to down-convert RF signals received from the RFFE circuitry 208 and provide baseband signals to the baseband circuitry 204. RF circuitry 206 may also include transmitter circuitry 206B, which may include circuitry to up-convert baseband signals provided by the baseband circuitry 204 and provide RF output signals to the RFFE circuitry 208 for transmission.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio integrated circuit (IC) circuitry may be provided for processing signals for each spectrum, although the scope of the embodiments is not limited in this respect.

RFFE circuitry 208 may include a receive signal path, which may include circuitry configured to operate on RF beams received from one or more antennas 210. The RF beams may be transmit beams formed and transmitted by the AN 110 while operating in mmWave or sub-mmWave frequency rang. The RFFE circuitry 208 coupled with the one or more antennas 210 may receive the transmit beams and proceed them to the RF circuitry 206 for further processing. RFFE circuitry 208 may also include a transmit signal path, which may include circuitry configured to amplify signals for transmission provided by the RF circuitry 206 for transmission by one or more of the antennas 210, with or without beamforming. In various embodiments, the amplification through transmit or receive signal paths may be done solely in the RF circuitry 206, solely in the RFFE circuitry 208, or in both the RF circuitry 206 and the RFFE circuitry 208.

In some embodiments, the RFFE circuitry 208 may include a TX/RX switch to switch between transmit mode and receive mode operation. The RFFE circuitry 208 may include a receive signal path and a transmit signal path. The receive signal path of the RFFE circuitry 208 may include a low noise amplifier (LNA) to amplify received RF beams and provide the amplified received RF signals as an output (for example, to the RF circuitry 206). The transmit signal path of the RFFE circuitry 208 may include a power amplifier (PA) to amplify input RF signals (for example, provided by RF circuitry 206), and one or more filters to generate RF signals for beamforming and subsequent transmission (for example, by one or more of the one or more antennas 210).

Processors of the application circuitry 202 and processors of the baseband circuitry 204 may be used to execute elements of one or more instances of a protocol stack. For example, processors of the baseband circuitry 204, alone or in combination, may be used to execute Layer 3, Layer 2, or Layer 1 functionality, while processors of the application circuitry 202 may utilize data (for example, packet data) received from these layers and further execute Layer 4 functionality (for example, transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/AN, described in further detail below.

Figure 3B:
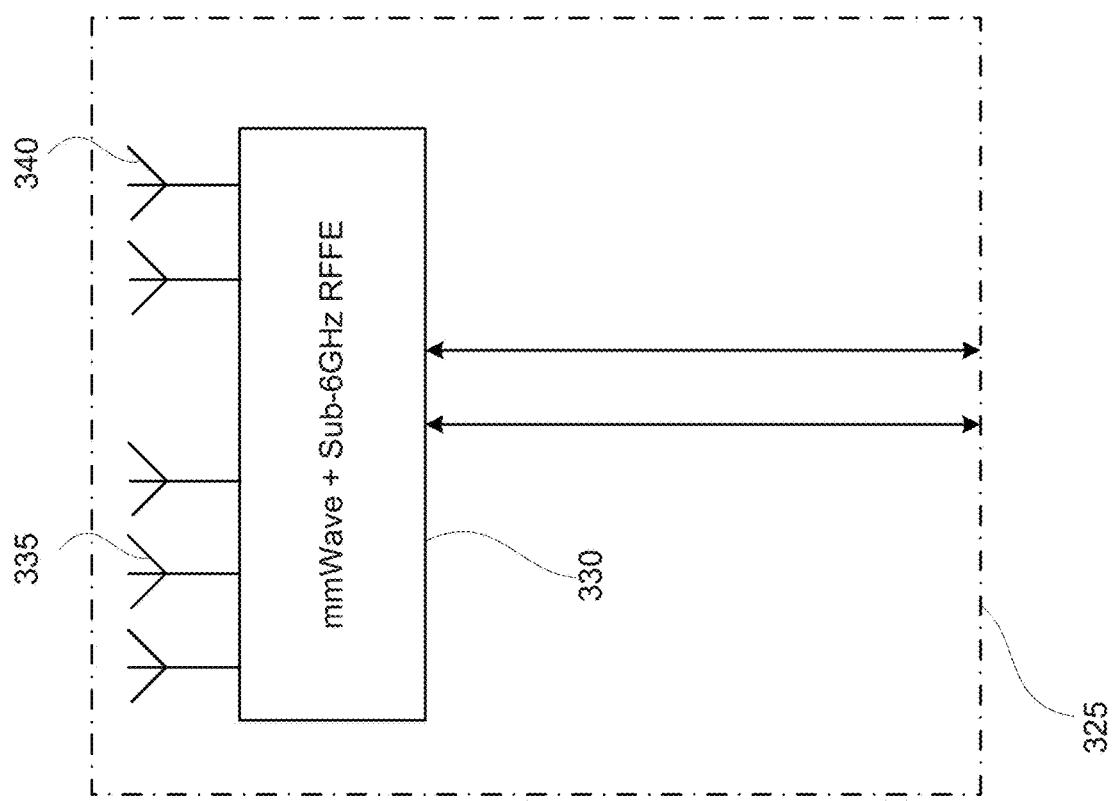
FIG. 3B illustrates an alternative RFFE in accordance with some embodiments.
Figure 3A:
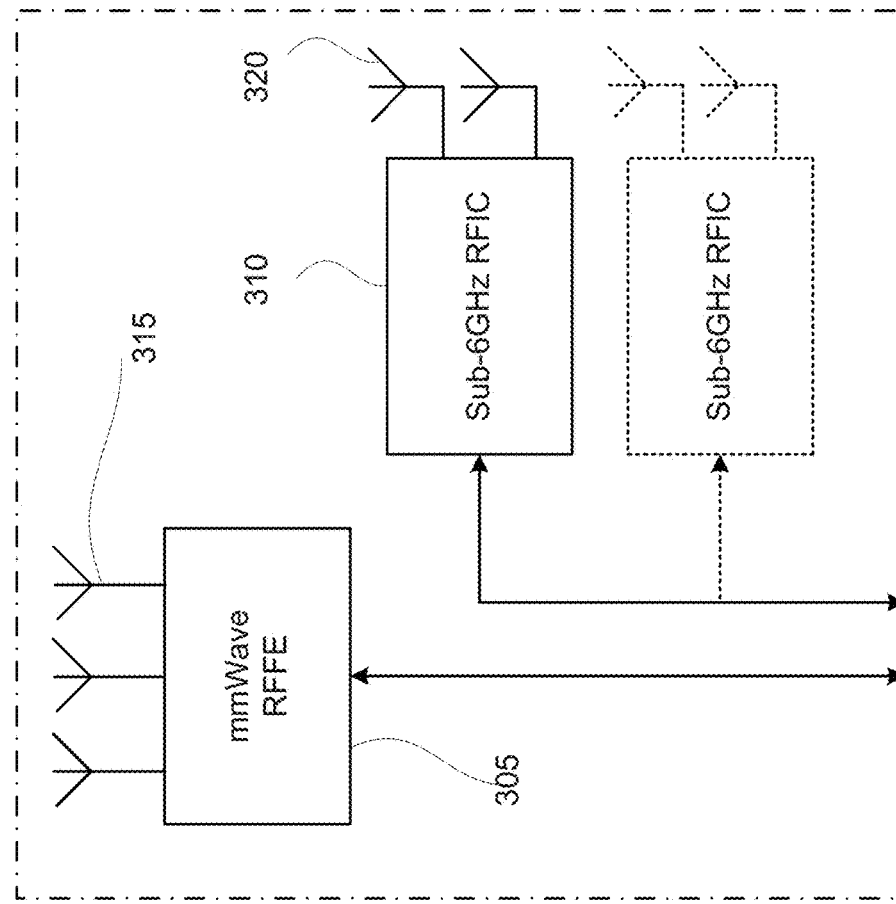
FIG. 3A illustrates an example radio frequency front end (RFFE) incorporating a millimeter Wave (mmWave) RFFE and one or more sub-millimeter wave radio frequency integrated circuits (RFICs) in accordance with some embodiments.

FIG. 3A illustrates an embodiment of a radio frequency front end 300 incorporating an mmWave RFFE 305 and one or more sub-6 GHz radio frequency integrated circuits (RFICs) 310. The mmWave RFFE 305 may be similar to and substantially interchangeable with the RFFE 165, RFFE 170, and/or the RFFE circuitry 208 in some embodiments. The mmWave RFFE 305 may be used for the UE 105 while operating in FR2 or mmWave; the RFICs 310 may be used for the UE 105 while operating in FR1, sub-6 GHz, or LTE bands. In this embodiment, the one or more RFICs 310 may be physically separated from the mmWave RFFE 305. RFICs 310 may include connection to one or more antennas 320. The RFFE 305 may be coupled with multiple antennas 315, which may constitute one or more antenna panels.

FIG. 3B illustrates an alternate embodiment of an RFFE 325. In this aspect both millimeter wave and sub-6 GHz radio functions may be implemented in the same physical RFFE 330. The RFFE 330 may incorporate both millimeter wave antennas 335 and sub-6 GHz antennas 340. The RFFE 330 may be similar to and substantially interchangeable with the RFFE 165, RFFE 170, and/or the RFFE circuitry 208 in some embodiments.

FIGS. 3A and 3B illustrate embodiments of various RFFE architectures for either the UE 105 or the AN 110.

In NR SA communications, an AN associated with a cell may utilize beamforming techniques to form transmit beams when transmitting signals to facilitate directional transmission to a UE at a particular location. This may be especially useful when operating at mmWave frequencies. The transmit beams from a cell with certain direction may provide the UE of a particular location with a stronger signal than other UEs of other locations. This may enable a better wireless connection between the UE and the AN associated with the cell. Multiple transmit beams from a cell may be formed by an antenna panel of the AN associated with the cell. For example, a maximum of 64 transmit beams may be formed with different transmit-beam configurations from a cell. Such transmit-beam configurations may utilize beamforming technology implemented by one or more antenna panels 180. Then, the transmit beams may be received and measured by the UE. In some embodiments, the UE may further form one or more receive beams while receiving. Thus, a larger measurement gap may be needed to accommodate a longer time needed for reception or processing a reference signal when beamforming is involved.

Figure 4:
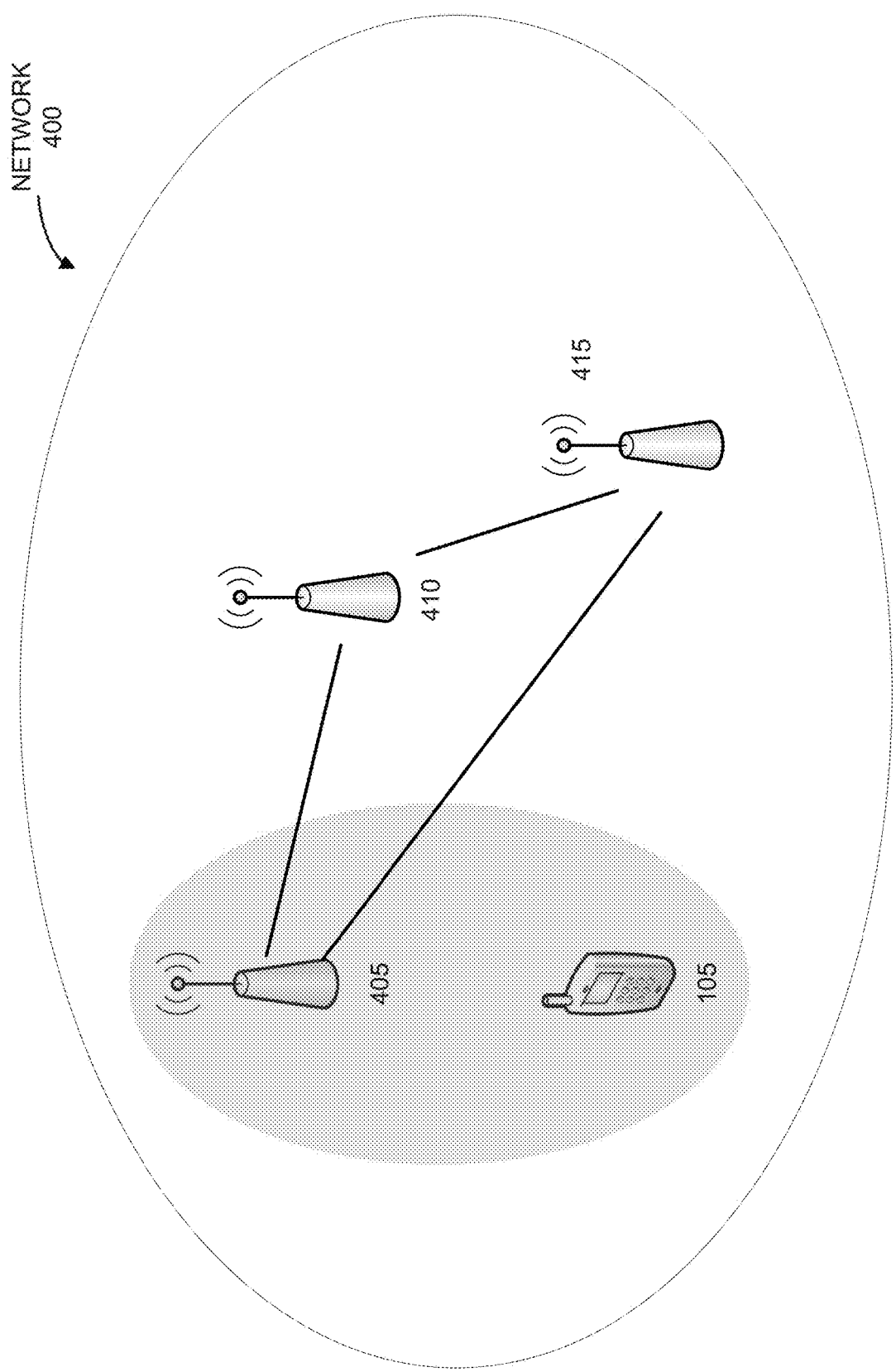
FIG. 4 illustrates an example of an NR SA network in accordance with some embodiments.

FIG. 4 illustrates an NR SA network 400 that provides radio access network for 5G. in various embodiments, ANs 405, 410, and 415 may be Next-Generation RAN (NG-RAN) nodes, which are associated with their corresponding cells. In an example, the AN 405 may be associated with a serving cell of the UE 105, and the other ANs 410 and 415 may be associated with non-serving cells of the UE 105. Any of the ANs described herein may be similar to and substantially interchangeable with the AN 110 in some embodiments. In NG-RAN, a gNB may be a 5G base station and provide NR user plane and control plane services, whereas an ng-gNB may be a base station that can provide LTE/E-UTRAN services. The gNBs and ng-eNBs may be interconnected with each other by means of the Xn interface or the NG interfaces to the 5G Core (5GC). NG RAN may operate in both SA operation and NSA operation. In SA operation, the gNB is connected to the 5GC; in NSA operation, NR and LTE are tightly integrated and connect to the existing 4G Core Network EPC, leveraging Dual Connectivity (DC) toward the terminal.

In NR SA, the AN 405 may be a gNB and used to configure one or more measurement gaps to the UE 105, with a carrier frequency of FR1 or FR2. The scheduling or configuration may be conducted via one or more Radio Resource Control (RRC) messages. The ANs 410 and 415 may be gNB or ng-gNB. In one example, the AN 410 may be a gNB operating with NR technologies and the AN 415 may be an ng-gNB operating with LTE/E-UTRA technologies. Each of the ANs 405, 410, and 415 may transmit one or more reference signals. The carrier frequency of a reference signal (RS) from the AN 405 or 410 may be an FR1 or FR2 frequency. The RS may be NR synchronization signals (SS) and/or CSI-RS.

In NR SA, the AN 405, as a serving cell to the UE 105, may operate in either FR1 or FR2, or a carrier aggregation (CA) of both FR1 and FR2 while configuring one or more measurement gaps to the UE 105. The measurement gap may be a UE or "per UE" measurement gap, which refers to a measurement gap that the UE 105 may use with all carrier frequencies it may use. This means that the UE 105 may only comply with one measurement gap for all frequencies that it may operate at. Alternatively or additionally, the measurement gap may be a frequency range (FR) measurement gap, which refers to a measurement gap that the UE 105 may use when operating in a certain frequency range, for example, an FR1 or FR2. An FR measurement gap may include, but not be limited to, FR1 measurement gap and FR2 measurement gap, which correspond to a frequency range of the carrier frequency of the UE 105. Note that a UE measurement gap or an FR measurement gap may correspond to a plurality of measurement gap patterns and further determination may be required to schedule a particular measurement gap pattern to the UE 105.

In an example that the UE 105 supports operations in FR1 and FR2 of NR, and at sub-6 GHz of LTE services, if different measurement gaps are to be configured to the UE 105, the UE 105 may operate to measure a reference signal in one frequency range while receiving or transmitting data in another frequency range simultaneously. For example, if the AN 405 of NR SA configures FR1 measurement gap and FR2 measurement gap to the UE 105 for operations in FR1 and FR2 respectively, the UE 105 may measure a reference signal of FR2 transmitted from the AN 410 in compliance with the FR2 measurement gap and receive or transmit a data signal of FR1 from or to the AN 405 simultaneously. Such an operation may increase data throughput at the UE 105, since a more efficient measurement gap may be configured to the UE 105 at certain frequencies.

Figure 5:
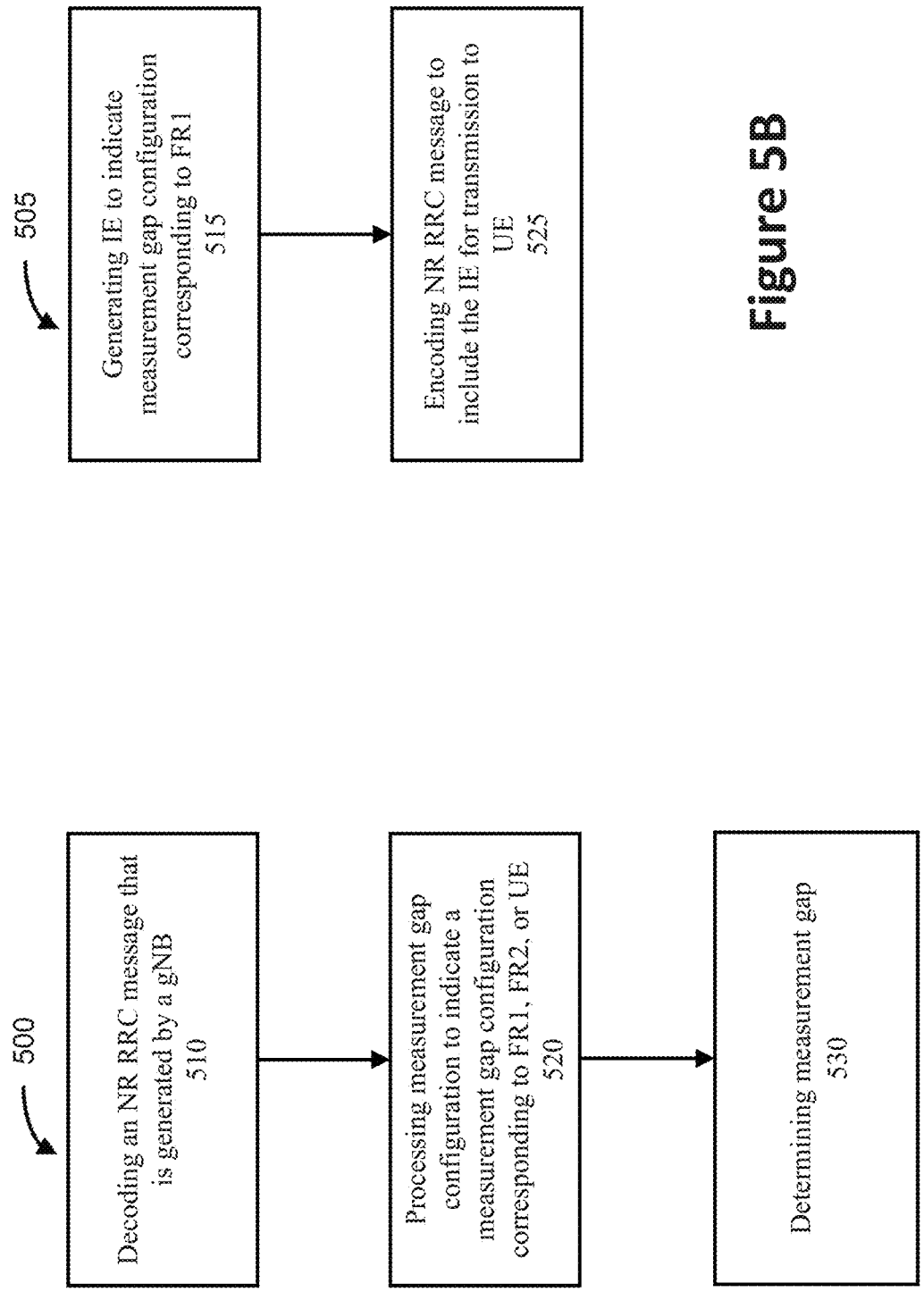
FIG. 5A illustrates an operation flow/algorithmic structure to facilitate a process of measurement gap configuration by a UE in NR SA in accordance with some embodiments.
FIG. 5B illustrates an operation flow/algorithmic structure to facilitate the process of measurement gap configuration by the AN in NR SA in accordance with some embodiments.

FIG. 5A illustrates an operation flow/algorithmic structure 500 to facilitate a process of measurement gap configuration by the UE 105 in NR SA, in accordance with some embodiments. The operation flow/algorithmic structure 500 may be performed by the UE 105 or circuitry thereof.

The operation flow/algorithmic structure 500 may include, at 510, decoding an NR RRC message by the UE 105. The NR RRC message may be generated by a gNB in an NR SA network. The gNB may be the same or substantially similar to the AN 405 and the AN 110. The UE 105 may receive the NR RRC message and decode the message to detect a measure gap configuration in the NR RRC message. The NR RRC message may be transmitted and received via NR services between the AN 405 and the UE 105. The NR services may operate at a frequency of FR1 or FR2, or a carrier aggregation (CA) of an FR1 frequency and an FR2 frequency. The measurement gap configuration may be indicated by an information element (IE) of the NR RRC message. The measurement gap configuration may indicate a "UE measurement gap" for the UE 105 operating at all frequencies, including but not limited to FR1 and FR2. The UE measurement gap may be referred to as "per UE." Such an operation in FR1 may operate with NR services, LTE/E-UTRA services, or other like services. In some embodiments, the measurement gap configuration may indicate a measurement gap for the UE 105 operating in a particular frequency range, which may be referred to as "per FR." For example, an FR1 measurement gap configuration may correspond to a measurement gap configuration that may be used for an operating frequency or carrier frequency within the range of FR1. When the UE 105 operates with LTE/E-UTRA services in sub-6 GHz, the FR1 measurement gap configuration may apply as well. Similarly, an FR2 measurement gap configuration may correspond to a measurement gap configuration that may be used for an operating frequency or carrier frequency within the range of FR2.

The operation flow/algorithmic structure 500 may further include, at 520, a measurement gap configuration to indicate a measurement gap configuration corresponding to FR1, FR2, or UE, based on the decoded NR RRC message. Upon the type of measurement gap configurations (e.g., UE, FR1, and FR2) that is configured by the gNB, the UE 105 may process to determine the measurement gap configuration according to the decoded IE of the NR RRC message. One measurement gap configuration may be configured and accordingly processed. For example, if the measurement gap configuration is a UE measurement gap configuration, there may only be one such measurement gap configuration for the UE 105. In contrast, if the measurement gap configuration is a per FR configuration, one or more measurement gap configurations may be configured to the UE 105. For example, if the measurement gap configuration is an FR1 measurement gap configuration, an FR2 measurement gap configuration may further be configured to the UE to indicate a measurement gap for UE operations in frequency range of FR2. The FR1 and FR2 measurement gap configurations may be configured in one IE of the NR RRC message, or in respective IEs of the NR RRC message. The UE 105 may also decode one or more NR RRC messages to determine one or more measurement gap configurations.

In some embodiments, the measurement gap configuration may indicate the type of the measurement gap configurations first, such as a gap for FR1, for FR2, or for per UE. Then, the measurement gap configuration may further indicate one or more of the respective measurement gap configurations for FR1, FR2, or per UE.

The operation flow/algorithmic structure 500 may further include, at 530, determining a measurement gap based on the processed measurement gap configuration. If the processed measurement gap configuration is a UE measurement gap configuration, the UE 105 may determine the measurement gap for all the frequencies at which the UE 105 may operate. If the processed measurement gap configuration is an FR1 or FR2 measurement gap, the UE 105 may determine the measurement gap for the UE 105 operating at FR1 or FR2. In some embodiments, when both FR1 and FR2 measurement gap configurations are configured by the gNB and processed by the UE 105, the UE 105 may determine respective measurement gaps for FR1 and FR2 operations.

In some embodiments, the UE 105 may further determine one or more measurement gap patterns based on the determined measurement gap. Each measure gap pattern may be associated with a gap pattern identification (ID). The UE 105 may operate in accordance with the determined measurement gap or gap pattern. Such an operation may include, but not be limited to, cell detection, cell identification, and measurements of the serving cell or neighbor cell. The operations may be according to LTE/E-UTRA services or NR services. If the determined measurement gap is a UE measurement gap, the UE 105 may measure the reference signal in a cell identification event based on the UE measurement gap, no matter which carrier frequency the UE 105 may use. The cell may operate with LTE/E-UTRA or NR services. The cell may be a serving cell or a neighbor cell to the UE 105.

In some embodiments, if the determined measurement gap is a per FR measurement gap (e.g., FR1 or FR2), the UE 105 may measure the reference signal in a cell identification event based on the FR1 (or FR2) measurement gap when the reference signal is in FR1 (or FR2). When the reference signal is in FR1, the UE 105 and the corresponding cell may be operating with NR or LTE/E-UTRA services.

FIG. 5B illustrates an operation flow/algorithmic structure 505 to facilitate the process of measurement gap configuration by the AN 405 operating in NR SA, in accordance with some embodiments. The AN 405 may be a gNB in the NR SA network. The operation flow/algorithmic structure 505 may be performed by the AN 110 or circuitry thereof.

The operation flow/algorithmic structure 505 may include, at 515, generating an IE to indicate a measurement gap configuration corresponding to FR1. As above discussed, such a measurement gap configuration may be used for the UE 105 to configure a corresponding measurement gap configuration or gap pattern for UE operations in FR1. Alternatively or additionally, an FR2 measurement gap configuration may be indicated by the IE for UE operations in FR2. Then, alternatively or additionally, the FR1 and FR2 measurement gap configurations, a "per UE" measurement gap, may be indicated by the IE.

The operation flow/algorithmic structure 505 may further include, at 525, encoding a NR RRC message to include the IE for transmission to the UE. The gNB may encode the IE of the measurement gap configuration into an NR RRC message and transmit that message to the UE 105 then. One or more measurement gap configurations may be encoded into the NR RRC message.

One example of a measurement gap configuration based on different gap types is illustrated in Table 1. Corresponding Abstract Syntax Notation One (ASN.1) code for configuring measurement gap types is in bold in Table 1. In this example, the gap type may be configured based on the types of available measurement gaps, such as per UE or per FR.

The baseband circuitry 204 may further include one or more interfaces to communicatively couple to other circuitries/devices, such as a memory interface 612 (e.g., an interface to send/receive data to/from memory external to the baseband circuitry 204), an application circuitry interface 614 (for example, an interface to send/receive data to/from the application circuitry 202 of FIG. 2), an RF circuitry interface 616 (for example, an interface to send/receive data to/from RF circuitry 206 of FIG. 2), a wireless

TABLE 1

```
-- ASN1START
--TAG-MEAS-GAP-CONFIG-START
MeasGapConfig ::=        SEQUENCE {
    gapFR2           SetupRelease { GapConfig }    OPTIONAL,
    gap              SetupRelease { GapConfig }    OPTIONAL,
    gapType              ENUMERATE { perUE, perFR}
    ...
}
GapConfig ::=           SEQUENCE {
    gapOffset            INTEGER (0..159),
    mgl                  ENUMERATED {ms1dot5, ms3, ms3dot5, ms4, ms5dot5, ms6},
    mgrp                 ENUMERATED {ms20, ms40, ms80, ms160},
    mgta                 ENUMERATED {ms0, ms0dot25, ms0dot5},
    ...
}
-- TAG-MEAS-GAP-CONFIG-STOP
-- ASN1STOP
```

Another example of a measurement gap configuration based on different gap types is illustrated in Table 2. Corresponding ASN.1 code for configuring measurement gap types is in bold in Table 2. In this example, the gap type may be configured as per UE, per FR1, or per FR2. For example, "gapPerUE" may configure a UE to comply with a measurement gap configuration at all carrier frequencies. In contrast, "gapFR1" and "gapFR2" may configure a UE to comply with different measurement gaps for different carrier frequencies.

hardware connectivity interface 618 (for example, an interface to send/receive data to/from Near Field Communication (NFC) components, Bluetooth® components (for example, Bluetooth® Low Energy), Wi-Fi® components, and other communication components), and a power management interface 620 (for example, an interface to send/receive power or control signals).

Figure 7:
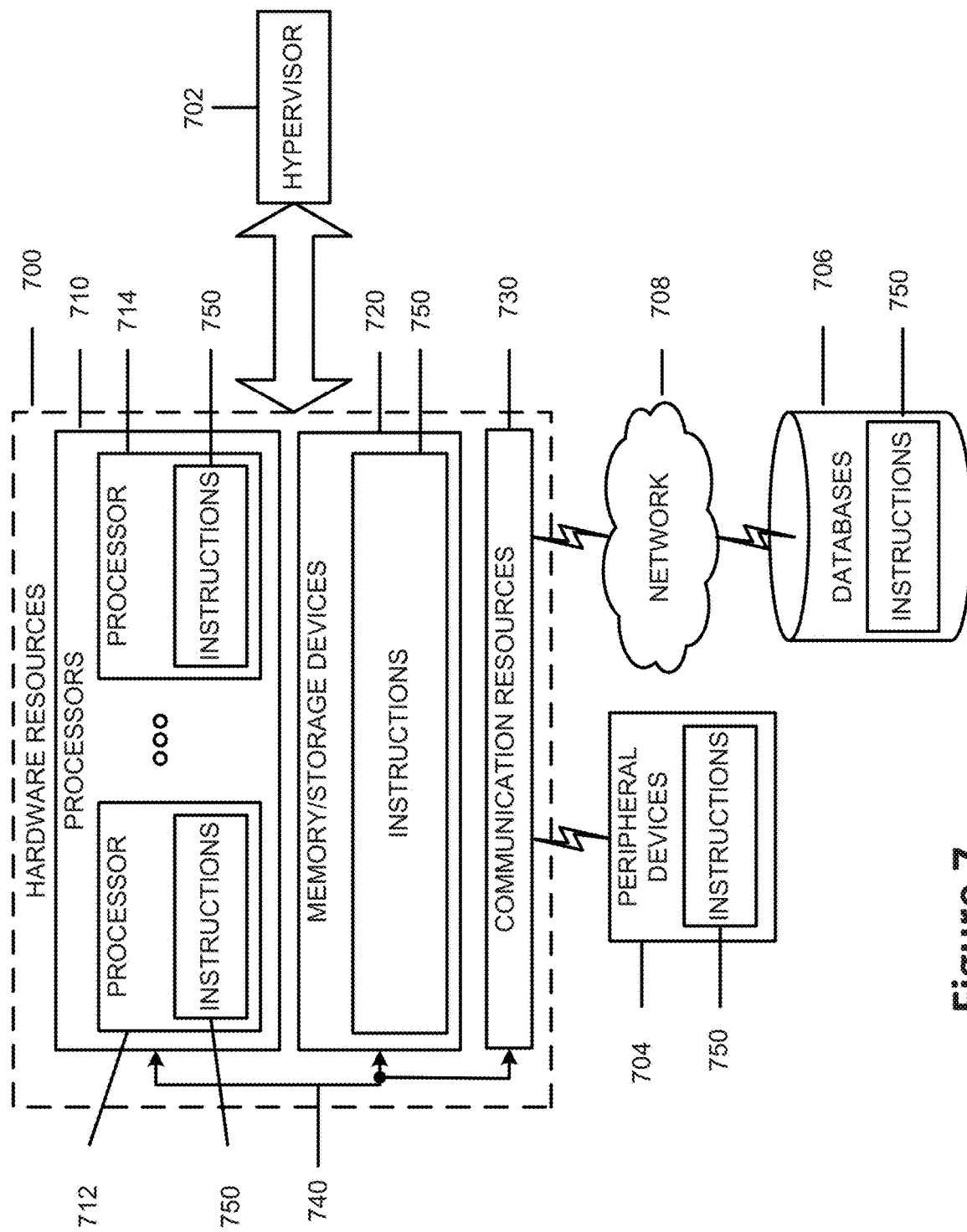
FIG. 7 illustrates hardware resources in accordance with some embodiments.

FIG. 7 is a block diagram illustrating components, according to some example embodiments, able to read instructions from a machine-readable or computer-readable medium (for

TABLE 2

```
-- ASN1START
--TAG-MEAS-GAP-CONFIG-START
MeasGapConfig ::=                SEQUENCE {
    gapFR2                   SetupRelease { GapConfig }    OPTIONAL,
    gapFR1                   SetupRelease { GapConfig }    OPTIONAL,
    gapPerUE                  SetupRelease { GapConfig }       OPTIONAL
    ...
}
GapConfig ::=               SEQUENCE {
    gapOffset               INTEGER (0..159),
    mgl                     ENUMERATED {ms1dot5, ms3, ms3dot5, ms4, ms5dot5, ms6},
    mgrp                     ENUMERATED {ms20, ms40, ms80, ms160},
    mgta                    ENUMERATED {ms0, ms0dot25, ms0dot5},
    ...
}
-- TAG-MEAS-GAP-CONFIG-STOP
-- ASN1STOP
```

FIG. 6 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 604A-604E, respectively, to send/receive data to/from the memory 204G. The processors 204A-204E may be used to process the decoded NR RRC message to determine corresponding measurement gap configuration(s).

example, a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (for example, network function virtualization (NFV)) is utilized, a hypervisor 702 may be executed to provide an execution environment for one or more network slices/sub-slices to utilize the hardware resources 700.

The processors 710 (for example, a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (for example, for coupling via a Universal Serial Bus (USB)), cellular communication components, NFC components, Bluetooth® components (for example, Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein. For example, in an embodiment in which the hardware resources 700 are implemented into the UE 105, the instructions 750 may cause the UE to perform some or all of the operation flow/algorithmic structure 500. In other embodiments, the hardware resources 700 may be implemented into the AN 110. The instructions 750 may cause the AN 110 to perform some or all of the operation flow/algorithmic structure 500. The instructions 750 may reside, completely or partially, within at least one of the processors 710 (for example, within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Some non-limiting Examples of various embodiments are provided below.

Example 1 may include one or more non-transitory computer-readable media (NTCRM) comprising instructions to, upon execution of the instructions by one or more processors of a UE, cause the UE to: decode a new radio (NR) radio resource control (RRC) message that is generated by a next-generation NodeB (gNB); process, based on the decoded NR RRC message, a first measurement gap configuration to indicate a measurement gap configuration corresponding to a frequency range 1 (FR1); and determine an FR1 measurement gap, based on the processed first measurement gap configuration.

Example 2 may include the one or more NTCRM of example 1 and/or some other example herein, wherein the first measurement gap configuration is indicated by an information element (IE) in the NR RRC message.

Example 3 may include the one or more NTCRM of example 2 and/or some other example herein, wherein, upon execution, the instructions further cause the UE to process, based on the decoded NR RRC message, a second measurement gap configuration to indicate a measurement gap configuration corresponding to a frequency range 2 (FR2); and determine an FR2 measurement gap, based on the processed second measurement gap configuration.

Example 4 may include the one or more NTCRM of example 3 and/or some other example herein, wherein the second measurement gap configuration is indicated by the IE in the NR RRC message, or an additional IE in the NR RRC message.

Example 5 may include the one or more NTCRM of example 3 and/or some other example herein, wherein, upon execution, the instructions further cause the UE to operate at an FR1 frequency according to the determined FR1 measurement gap and operate at an FR2 frequency according to the determined FR2 measurement gap.

Example 6 may include the one or more NTCRM of example 1 and/or some other example herein, wherein the FR1 measurement gap is configured for measurements in an NR operation or a long term evolution (LTE) operation that operates below 6 GHz.

Example 7 may include the one or more NTCRM of example 6 and/or some other example herein, wherein, upon execution, the instructions further cause the UE to operate at an FR1 frequency in compliance with the determined FR1 measurement gap while measuring at a frequency range 2 (FR2) frequency absent a measurement gap.

Example 8 may include the one or more NTCRM of example 1 and/or some other example herein, wherein the UE is to operate in a standalone (SA) NR network.

Example 9 may include one or more non-transitory computer-readable media (NTCRM) comprising instructions to, upon execution of the instructions by one or more processors of a UE, cause the UE to: decode a new radio (NR) radio resource control (RRC) message that is generated by a next-generation NodeB (gNB); process, based on the decoded NR RRC message, a measurement gap configuration to indicate a measurement gap configuration corresponding to a frequency range (FR) or a UE device (per FR measurement gap or per UE measurement gap); and determine a measurement gap, based on the processed measurement gap configuration.

Example 10 may include the one or more NTCRM of example 9 and/or some other example herein, wherein the per FR measurement gap is a frequency range 1 (FR1) measurement gap corresponding to the UE operating at FR1 or a frequency range 2 (FR2) measurement gap corresponding to the UE operating at FR2.

Example 11 may include the one or more NTCRM of example 9 and/or some other example herein, wherein the per FR measurement gap includes a frequency range 1 (FR1) measurement gap corresponding to the UE operating at FR1 and a frequency range 2 (FR2) measurement gap corresponding to the UE operating at FR2.

Example 12 may include one or more non-transitory computer-readable media (NTCRM) comprising instructions to, upon execution of the instructions by one or more processors of a next-generation NodeB (gNB) associated with a serving cell, cause the gNB to: generate an information element (IE) to indicate a first measurement gap configuration corresponding to a frequency range 1 (FR1); and encode a new radio (NR) radio resource control (RRC) message to include the IE for transmission to a user equipment (UE).

Example 13 may include the one or more NTCRM of example 12 and/or some other example herein, wherein the IE is to indicate a first measurement gap configuration corresponding to a user equipment (UE) of any operating frequency.

Example 14 may include the one or more NTCRM of example 12 and/or some other example herein, wherein the IE is further to indicate a second measurement gap configuration corresponding to a frequency range 2 (FR2).

Example 15 may include the one or more NTCRM of example 12 and/or some other example herein, wherein, upon execution, the instructions further cause the gNB to transmit the encoded NR RRC message to the UE.

Example 16 may include an apparatus, comprising: one or more baseband processors to decode a new radio (NR) radio resource control (RRC) message that is received at the UE from a next-generation NodeB (gNB); and a central processing unit (CPU) coupled with the one or more baseband processors, the CPU to determine, based on the decoded NR RRC message, a UE measurement gap for all frequencies at which the UE is to operate.

Example 17 may include the apparatus of example 16 and/or some other example herein, wherein the UE is to operate in a frequency range 1 (FR1) and/or a frequency range 2 (FR2).

Example 18 may include the apparatus of example 17 and/or some other example herein, wherein the measurement gap configuration is indicated by an information element (IE) of the NR RRC.

Example 19 may include the apparatus of example 17 and/or some other example herein, wherein the one or more baseband processors are further to operate according to the determined UE measurement gap.

Example 20 may include the apparatus of example 19 and/or some other example herein, wherein to operate according to the determined UE measurement gap includes measuring NR or long term evolution (LTE) measurements, and receiving or transmitting data.

Example 21 may include the apparatus of example 19 and/or some other example herein, wherein to operate according to the determined UE measurement gap is to measure NR or long term evolution (LTE) measurements in the FR1 with the determined UE measurement gap while measuring NR measurement in the FR2 with the same determined UE measurement gap.

Example 22 may include the apparatus of example 16 and/or some other example herein, wherein the CPU is to further process, based on the decoded NR RRC message, a measurement gap configuration that is to indicate a UE measurement gap for all frequencies at which the UE is to operate.

Example 23 may include the apparatus of example 22 and/or some other example herein, wherein the measurement gap configuration is to indicate a frequency range (FR) measurement gap that is to be applied to a frequency range in which the UE is to operate.

Example 24 may include an apparatus, comprising: a central processing unit (CPU) to generate an information element (IE) to indicate a measurement gap configuration corresponding to a frequency range (FR) or a user equipment (UE); and one or more baseband processors coupled with the CPU, the one or more baseband processors to encode a new radio (NR) radio resource control (RRC) message to include the IE.

Example 25 may include the apparatus of example 24 and/or some other example herein, wherein the measurement gap configuration corresponding to the FR includes a frequency range 1 (FR1) measurement gap and a frequency range 2 (FR2) measurement gap.

Example 26 may include an apparatus comprising means to perform one or more elements of a method or NTCRM described in or related to any of examples 1-15, or any other method or process described herein.

Example 27 may include one or more non-transitory computer-readable media comprising instructions to cause an electronic device, upon execution of the instructions by one or more processors of the electronic device, to perform one or more elements of a method or NTCRM described in or related to any of examples 1-15, or any other method or process described herein.

Example 28 may include an apparatus comprising logic, modules, and/or circuitry to perform one or more elements of a method or NTCRM described in or related to any of examples 1-15, or any other method or process described herein.

Example 29 may include a method, technique, or process as described in or related to any of examples 1-15, or portions or parts thereof.

Example 30 may include an apparatus comprising: one or more processors and one or more computer-readable media comprising instructions that, when executed by the one or more processors, cause the one or more processors to perform the method, techniques, or process as described in or related to any of examples 1-15, or portions thereof.

The present disclosure is described with reference to flowchart illustrations or block diagrams of methods, apparatuses (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. One or more non-transitory computer-readable media (NTCRM) comprising instructions to, upon execution of the instructions by one or more processors of a user equipment (UE), cause the UE to:
   decode a new radio (NR) radio resource control (RRC) message that is generated by a next-generation NodeB (gNB) in an NR standalone (SA) network, wherein the NR RRC message includes both a first measurement gap configuration and a second measurement gap configuration, the first measurement gap configuration corresponding to a frequency range 1 (FR1) of NR, and the second measurement gap configuration corresponding to a frequency range 2 (FR2) of NR;
   process, based on the decoded NR RRC message, the first measurement gap configuration; and
   determine an FR1 measurement gap, based on the processed first measurement gap configuration.

2. The one or more NTCRM of claim 1, wherein the first measurement gap configuration is indicated by an information element (IE) in the NR RRC message.

3. The one or more NTCRM of claim 2, wherein, upon execution, the instructions further cause the UE to:
   process, based on the decoded NR RRC message, the second measurement gap configuration; and
   determine an FR2 measurement gap, based on the processed second measurement gap configuration.

4. The one or more NTCRM of claim 3, wherein the second measurement gap configuration is indicated by the IE in the NR RRC message, or an additional IE in the NR RRC message.

5. The one or more NTCRM of claim 3, wherein, upon execution, the instructions further cause the UE to operate at an FR1 frequency according to the determined FR1 measurement gap and operate at an FR2 frequency according to the determined FR2 measurement gap.

6. The one or more NTCRM of claim 1, wherein the UE is configured to operate in an NR Standalone (SA) network.

7. The one or more NTCRM of claim 6, wherein, upon execution, the instructions further cause the UE to:
   operate at an FR1 frequency in compliance with the determined FR1 measurement gap while measuring at an FR2 frequency absent an FR2 measurement gap.

8. The one or more NTCRM of claim 1, wherein the first measurement gap configuration is same as the second measurement gap configuration.

9. One or more non-transitory computer-readable media (NTCRM) comprising instructions to, upon execution of the instructions by one or more processors of a next-generation NodeB (gNB) associated with a serving cell, cause the gNB to:
   generate a first information element (IE) to indicate a first measurement gap configuration corresponding to a frequency range 1 (FR1) of new radio (NR), and a second IE to indicate a second measurement gap configuration corresponding to a frequency range 2 (FR2) of NR, wherein the gNB is in an NR standalone (SA) network; and
   encode an NR radio resource control (RRC) message to include both the first IE indicating the first measurement gap configuration and the second IE indicating the second measurement gap configuration for transmission to a user equipment (UE).

10. The one or more NTCRM of claim 9, wherein the first IE is a same IE as the second IE.

11. The one or more NTCRM of claim 9, wherein the first IE is to indicate a first measurement gap configuration corresponding to the UE of any operating frequency.

12. The one or more NTCRM of claim 9, wherein, upon execution, the instructions further cause the gNB to transmit the encoded NR RRC message to the UE.

13. A user equipment (UE), comprising:
   one or more baseband processors to decode a new radio (NR) radio resource control (RRC) message that is received at the UE from a next-generation NodeB (gNB) in an NR standalone (SA) network, wherein the NR RRC message includes a UE measurement gap configuration corresponding to both a frequency range 1 (FR1) of NR and a frequency range 2 (FR2) of NR; and
   a central processing unit (CPU) coupled with the one or more baseband processors, the CPU to determine, based on the decoded NR RRC message, a UE measurement gap for the FR1 of NR and the FR2 of NR at which the UE is to operate.

14. The UE of claim 13, wherein the UE is to operate in a frequency range of sub-6 GHz as the FR1 and a millimeter wave (mmWave) range as the FR2.

15. The UE of claim 14, wherein the UE measurement gap configuration is indicated by an information element (IE) of the NR RRC message.

16. The UE of claim 14, wherein the one or more baseband processors are further to operate according to the determined UE measurement gap.

17. The UE of claim 16, wherein to operate according to the determined UE measurement gap includes measuring NR, and receiving or transmitting data.

18. The UE of claim 16, wherein to operate according to the determined UE measurement gap is to measure NR in the frequency range of sub-6 GHz with the determined UE measurement gap while measuring NR in the mmWave range with the same determined UE measurement gap.

19. The UE of claim 13, wherein the CPU is to further process, based on the decoded NR RRC message, a UE measurement gap for all frequencies at which the UE is to operate.

20. The UE of claim 19, wherein the UE measurement gap configuration is to indicate a frequency range measurement gap that is to be applied to a frequency range in which the UE is to operate.

* * * * *